United States Patent [19]
Parker

[11] Patent Number: 5,839,179
[45] Date of Patent: Nov. 24, 1998

[54] BUNGEE LOADER

[76] Inventor: David J. Parker, P. O. Box 382, Tok, Ak. 99780

[21] Appl. No.: 394,515

[22] Filed: Feb. 27, 1995

[51] Int. Cl.$^6$ ..................................................... B23P 19/02
[52] U.S. Cl. ............................................................. 29/235
[58] Field of Search .............................. 254/10.5; 29/227, 29/215–218, 225, 251, 252, 235

[56] References Cited

U.S. PATENT DOCUMENTS 5,507,470  4/1996  Amstutz ..................................... 29/227

Primary Examiner—Robert C. Watson

[57] ABSTRACT

A bungee loader having a base and two fixed vertical posts with a movable cross arm sleeved over each post. The cross arm further has two descending arms that are slideably connected to the cross arm with sleeves. The descending arms further each have a fixed cross bar containing two fixed hooks. A self contained hydraulic jack attached to the base is operable to lift the cross arm and slideably attached descending arms. The slideable descending arms lift and load a bungee cord on a hydrasorb unit centrally secured in the base.

5 Claims, 2 Drawing Sheets

15 = Hydrasorb: Piper part #12998-00

15 = Hydrasorb; Piper part #12998-00

18 = Bungee: Superioring part #1380 CW

BUNGEE LOADER

BACKGROUND

1. Field of the Invention

This invention pertains to the loading of bungees on certain aircraft landing gear. The invention more specifically pertains to light aircraft utilizing hydrasorb landing assemblies.

2. Description of the Prior Art

The hydrasorb is a bungee loaded shock absorber system used to absorb the energy created when the airplane weight transfers from the wing in flight to the landing gear on the ground. This energy transfer is accomplished by a hydrasorb unit that in part utilizes bungee cords. The bungee cords are of rubber and exert approximately 500 pounds compressive force. The bungees wear out and require periodic replacement.

Old bungee cords are generally stretched and less resilient and are removed by severing. To load new bungee cords it is necessary to place the bungee over the hydrasorb lower retaining ears then uniformly stretch the bungee upward, outward, above the top of the hydrasorb upper retaining ears. Then, while under compression move the bungee horizontally beyond the retention ears into the hydrasorb saddle and release the approximately 500 pounds force allowing the bungee to compress under force into its operative position.

The tool most commonly used to replace hydrasorb bungees employs a lever system. One end of the shock cord tool is clamped into a bench vise. After the hydrasorb unit is mounted in the device, the bungee is then looped over an alignment stud. A leverage arm approximately 2 feet long then describes an approximately 300 degree arc to stretch and position the bungee adjacent to the hydrasorb upper ears. The bungee cord is then forced over the ears by secondary leverage with screwdrivers. Once over the hydrasorb ears, the bungees, now under significant compression, snap abruptly into the hydrasorb saddle. This device takes 2 people to operate. Loading of the second bungee (2 per hydrasorb) results in the secondary leveraging bringing the screwdrivers into direct contact with the first bungee. This system is not safe. The leverage arm is under significant force and if the leverage arm is released, the 2 foot arm will forcefully reverse the approximately 300 degree arc and severely damage anything in its path. The screwdriver may damage the first bungee cord. This unit is not capable of removing a fresh bungee cord from a loaded hydrasorb unit. A loaded bungee cord that is incorrect (different grades are available) or damaged in the process would then have to be removed by severing, which, on a fresh bungee, is dangerous.

Prior Art U.S. Pat. No. 5,507,470 utilizes a hydraulic jack spring compressor and adjustable spring compression arms on a tall single post. Although some components bear similarities to those of a bungee loader, there are significant differences. The spring compressor under load operates in one plane only. The bungee loader operates under load in both vertical and horizontal planes. The spring compressor arms while movable, are actually held in fixed position while under load. The bungee loader utilizes the compressive force of the bungee itself to lock the bungee rail in horizontal alignment during the lift phase, then utilizes the bungee itself to provide the inward force vector to position bungee into hydrasorb saddle. This positive controlled horizontal movement under load aspect is absent in the spring compressor. The spring compressor is a close tolerance, fixed position mechanism that locks a spring into position then applies compressive force in a single plane. The bungee loader is a loose tolerance system ($1/32$s and $1/16$s, etc.) that allows for unequal expansion forces of the bungee, unequal forces applied to the locking/sliding sleeves on the lift arm sleeves, unequal lifting forces on the vertical posts resulting from the off center position of the hydraulic jack and flexible position of the hydrasorb unit in the base. A spring is not a bungee. The bungee loader double lifts from each end of the bungee over a center pivot post (hydrasorb lower ear saddle). The spring compressor has a single, non pivot compression vector. The bungee loader is easily portable allowing bungee replacement on the flight line and avoiding the need to bring the airplane to a hangar. The spring compressor lacks ease of portability.

SUMMARY OF THE INVENTION

It is the purpose of the present invention to provide a bungee loader that avoids the inherent disadvantages of the known bungee loading tools. More specifically, the purpose of the present invention is to provide a bungee loader that provides safe, positive bungee control during all phases of loading or unloading bungees on hydrasorb units; is easy to use; portable; that can work on different size hydrasorbs; that allows bench, floor, ground, field, shop or garage utilization; single person operation; requires no other tools; and is safer in operation.

In the present invention there is provided a base to which the hydrasorb is flexibly bolted. The base also provides a mounting plate for the hydraulic jack and a hold down/stability arm. Two vertical arms with loose tolerance sleeves guide a cross arm. The cross arm is attached by link chain to a bracket connecting to a high lift hydraulic jack. The chain connection to the jack provides adjustable lift positions for different sized hydrasorbs. The cross arm is further equipped with two lift arms via loose tolerance sleeves. The lift arms accept, cradle, spread, and retain the unexpanded bungee. The bungee lift arms further utilize the bungee compressive force to torque the loose tolerance lift arm sleeves into the cross arm as the bungee is expanded during the hydraulic lift operation. As more force is applied to the bungee more tension is applied to the lift arm sleeve which torques into the cross arm. This is a unique concept in this invention; without this torque action stop, the lift arms would prematurely slide in toward the hydrasorb as the bungee cord expansion changes the vector of pull. As the cross arm raises, the bungee vector tries to pull the lift arms inward and if not controlled at this point would result in the bungee pulling into the hydrasorb body below the hydrasorb upper ear thereby negating the loading operation. The cross arm is raised until the bungee cord will clear the hydrasorb upper ears at which time a tap or twist by hand on the lifting arm vertical stem releases the torque action stop of the loose tolerance sleeves and the bungees are guided over the hydrasorb upper ears. Releasing the hydraulic jack at that time lowers the bungee into the hydrasorb upper ear saddle. Light manual effort on the cross arm then depresses the lift arms and allows manual withdrawal of the hook arms horizontally to clear the bungee. The hook placement in the hook arm is to allow precise clearance of the raising bungee to clear the outside radius of the hydrasorb ears. The hooks are rotated inward to accommodate the changed bungee radius and allow easy removal. When the bungee is lowered into the saddle, the bungee radius decreases significantly.

The second bungee may be loaded over the first by repeating the loading actions. By reversing the loading sequence, an inappropriately selected or damaged bungee is removed.

At all phases of the loading/unloading operations, the bungee with its powerful force is under positive control.

DESCRIPTION OF THE PREFERRED EMBODIMENTS

Figure 1:
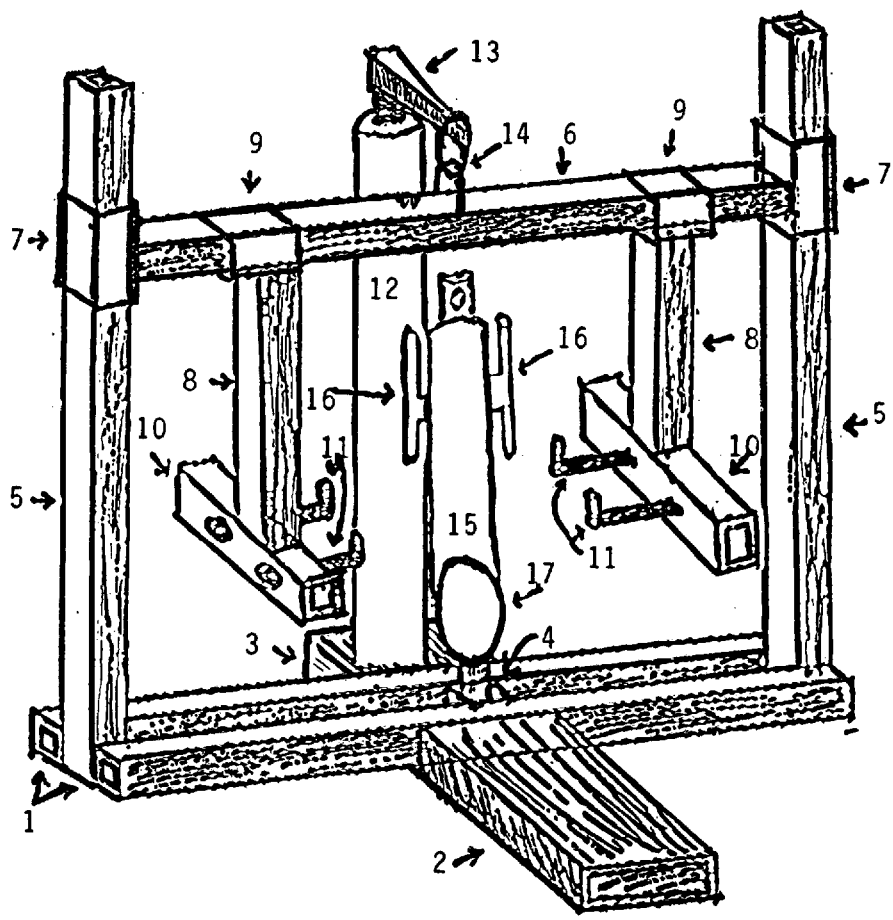
FIG. 1 is a one-quarter side view of the bungee loader with a hydrasorb unit in position preparatory to bungee installation.

The bungee loader FIG. 1 has a base (1) including a lateral support piece (2) and a hydraulic jack platform (3). The width and length of the base make the bungee loader quite stable. Centered in the base rails (1) are two plates with centered bolt holes (4). The bolt hole in the lower end of the hydrasorb aligns with the holes in the two plates and is restrained with a bolt FIG. 2 (4). At each end of the base unit (1) is a vertical post (5) extending upward to a height sufficient to accommodate various hydrasorb units.

The vertical posts (5) guide the cross arm (6) with loose tolerance sleeves (7) through its vertical range. Attached to the cross arms (6) are two lift arms (8). The lift arms (8) are attached to the cross arm (6) via a loose tolerance sleeve (9). The lift arms (8) connect the cross arm (6) to the hook arms (10) which contain the bungee retaining hooks (11). The hydraulic jack (12) is secured to platform (3) and positioned such that bracket (13) extends horizontally over cross arm (6). Cross arm (6) is connected to hydraulic jack bracket (13) by a length of open loop chain (14).

Figure 2:
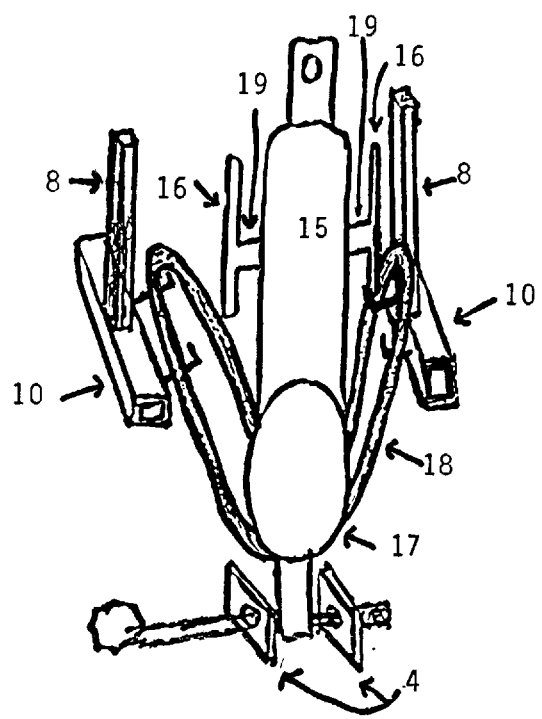
FIG. 2 is a view of a hydrasorb unit in the bungee loader mounting mechanism and bungee in start position for loading sequence.

The hydrasorb (15) FIGS. 1 and 2 has two upper bungee placement ears (16) and two lower bungee placement ears (17). The upper ears (16) are horizontally opposed. The lower ears (17) are horizontally opposed and rotated 90 degrees to the upper ears (16).

The bungee (18) FIG. 2 is a continuous elastic loop approximately 30 inches in circumference and approximately 0.850 inches in diameter that in its expanded form exerts over 500 pounds of contractive force.

In use, installing new bungees on a hydrasorb, the hydrasorb (15) is fixed to the mounting plates (4) by a bolt through the mounting plate and the bolt hole in the hydrasorb (4) FIG. 2. The hydraulic jack (12) is in its depressed position. The lift arms (8) are placed toward the outboard ends of the cross arm (6). A bungee is lowered down over the top of the hydrasorb (15) and placed such that the lower hydrasorb ears (17) each retain a central portion of the bungee as in FIG. 2. The lift arms (8) are then moved inward toward the hydrasorb (15) until the distal ends of the bungee loop can be cradled over the bungee lift arm hooks (11). The hydraulic jack (12) is activated and the cross arm (6) raises. The initial expansion of the bungee is upward and inward toward the hydrasorb (15). The inward force vector is denied by the torque action of the loose tolerance lift arm sleeve (9). This allows the bungee to be expanded upward and outward. This is a unique aspect of the bungee loader. If the bungee is not held outward, the compressive forces will pull the bungee into the body of the hydrasorb (15) which would consequently conflict with loading the bungee over the upper hydrasorb ears (16). Loading force vectors for the bungee are up, out, over, in, and down, describing a somewhat circular motion.

The cross arm (6) is elevated until the bungee loop retained by the bungee lift arm hooks (11) is above the hydrasorb upper ears (16). The lift arms (8) are then released from the torque action lock of the loose tolerance lift arm sleeves (9) with a manual twist action by the hands of the operator. The lift arms (8) are then manually positioned inward over the hydrasorb upper ear (16) flanges. This dimension is controlled by the precise distance between the hook arm hooks (11) once the bungee is positioned over the hydrasorb upper ears (16). The hydraulic jack is released allowing the bungee to compress down over the hydrasorb upper ear post (19). The hydrasorb upper and lower ears (16 & 17) retain the bungees. The cross arm (6) is further manually depressed by the operator and the lift arms (8) are manually moved to the outboard ends of the cross arm (6).

The second bungee (18) is loaded onto the hydrasorb (15) in identical fashion as the first bungee (two are required). After the second bungee (18) is loaded onto the hydrasorb (15) the hydrasorb (15) is unbolted from the bungee loader base plate (4) FIGS. 1 and 2 and is ready to be reinstalled on the airplane.

I claim:

1. A bungee loader having: a base; a hydrasorb attach means fixed on the base;

two guide posts extending vertically up from the base; a cross arm extending between and sliding on the guide posts; two loose tolerance cross arm slideable sleeves attached to the cross arm ends and mounted on the respective guide posts; two lift arms attached to and descending down from the cross arm; two loose tolerance slideable lift arm sleeves attached to each lift arm and mounted on the cross arm; a hook arm attached to each lift arm; two hooks horizontally attached to each hook arm; a link chain adjustable connection means from the cross arm to a connecting bracket; and a self-contained hydraulic jack mounted at one end on the base platform and the other end to said connecting bracket and operable to move the cross arm vertically to expand a bungee.

2. A bungee loader as claimed in claim 1, wherein said loose tolerance slideable cross arm sleeves allow non binding, off center, lifting forces as applied by said hydraulic jack.

3. A bungee loader as claimed in claim 1 wherein said hooks on said hook arms provide a bungee retention means.

4. A bungee loader as claimed in claim 3 wherein said hooks may be fixed in any degree of rotation to facilitate clearance of hydrasorb rounded ears.

5. A bungee loader as claimed in claim 1 wherein said hydrasorb attach means allows vertical hydrasorb orientation and alignment flexibility in the plane of said base.

* * * * *